June 14, 1927.  J. G. FERGUSON  1,632,062
REGULATOR
Filed Aug. 9, 1923   2 Sheets-Sheet 1

Inventor
John G. Ferguson
by E. W. Griggs  Atty

June 14, 1927.

J. G. FERGUSON

REGULATOR

Filed Aug. 9, 1923

Inventor
John G. Ferguson by E. W. Griggs   Atty.

Patented June 14, 1927.

1,632,062

UNITED STATES PATENT OFFICE.

JOHN G. FERGUSON, OF BROOKLYN, NEW YORK, ASSIGNOR TO WESTERN ELECTRIC COMPANY, INCORPORATED, OF NEW YORK, N. Y., A CORPORATION OF NEW YORK.

REGULATOR.

Application filed August 9, 1923. Serial No. 656,549.

This invention relates to a regulator.

More particularly, it relates to the automatic regulation of the amount of energy supplied to an energy transformer so as to control and regulate the rate of energy transformation thereof.

The invention, as applied to the regulation of a tuning fork or an electric motor, comprises, in general, means controlled by the cooperation of the device to be regulated and an independent constant unit indicating mechanism and employs such means to control and regulate the current supplied to damping coils associated with the fork or to the field windings of the motor.

More specifically stated, the invention as applied to the regulation of a tuning fork or an electric motor comprises a contact operated from the device whose speed is to be regulated and a contact of a clock which cooperate to control a relay or relays which in turn control and regulate the current to the damping coils or the field windings.

While the invention is being illustrated as applied to the regulation of the speed of a tuning fork and an electric motor it will be understood that its field of application is not so limited for it may be applied to other fields where the rate of transformation of an energy transformer is to be regulated by controlling the amount of energy supplied thereto.

Figure 1:
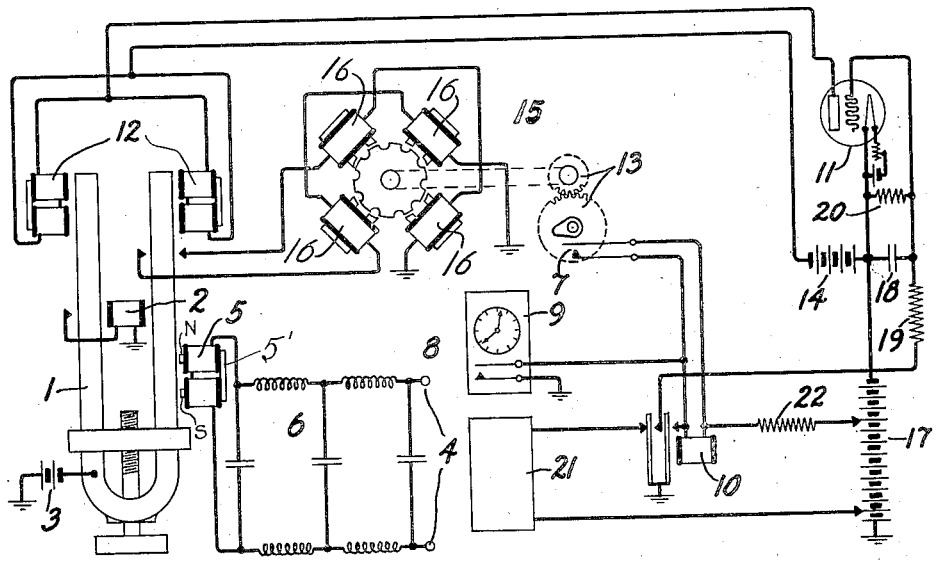
Fig. 1 shows diagrammatically the regulator applied to a tuning fork.

Fig. 1 shows a tuning fork 1 whose speed is to be regulated. The fork is driven by a driving magnet 2 supplied with operating current from a battery 3 or other source. The fork may be employed to supply a current of constant frequency to terminals 4. For this purpose an electromagnetic coil 5 comprising a magnetic core 5' having a north pole N and a south pole S is positioned in proximity to one of the tines of the fork so as to have induced therein an alternating electromotive force having a frequency equal to the frequency of vibration of the fork. A low pass filter 6, located between the coil 5 and the terminals 4, is designed to suppress currents of a frequency above the frequency of the fork so that there is then delivered to the terminals 4 a wave having a frequency of the frequency of vibration of the fork but without any of the harmonics thereof.

The regulator for controlling and regulating the speed of the fork comprises a contact 7 operated through the gears 13 by a La Cour or phonic wheel 15 driven from the tuning fork 1 in accordance with well known practice and a contact 8 operated by a clock 9. These contacts, 7 and 8 cooperate to control the duration of energization and deenergization of a relay 10 which, through an amplifier 11 controls the magnitude of current through damping coils 12 associated with the tines of the fork.

The electrically driven fork supplies impulses at the frequency of vibration of the fork to opposite pairs of magnets 16 which cause the wheel 15 to rotate at the speed of the fork.

The contact 8 is arranged to be closed once during each unit of time, for example, once a second. The ratio of the gears 13 is such that the contact 7 is also closed once during each of said units of time when the fork is vibrating at its normal constant rate. The contacts 7 and 8 are so adjusted that they close in a cyclic order. Contact 8 closes first, operating relay 10. Before contact 8 again closes, contact 7 closes, short-circuiting relay 10 and causing the release thereof. Normally the adjustment of these two contacts is such that the relay 10 is energized during a definite portion of each second and is released during the remainder thereof, such division of the seconds remaining constant if the speed of the fork remains constant. However, if the speed of the fork varies, the division of the unit of time will be changed depending upon whether the fork is vibrating faster or slower than normal.

The operation of the regulator is as follows:

Upon the closure of the clock contact 8, relay 10 operates and locks up through a contact thereof until contact 7 closes. During the time that relay 10 is operated, current from battery 17 charges condenser 18 through resistance 19. The condenser 18 continuously discharges through resistance 20 which is connected in parallel therewith and with the space path between the cathode and control electrode of the amplifier. The mean potential on the condenser 18 is thus applied to the control electrode and modifies the space current which flows from battery 14 through the damping coils 12. Any variation in the potential of the control electrode varies the current through the damping coils and changes the frequency of vibration of the fork. The voltage of battery 17 is such that the maximum potential supplied therefrom to the control electrode of the amplifier 11 will reduce the space current of the amplifier to zero and prevent the flow of current in its output circuit which includes the space path between the cathode and anode. If the period during which the relay 10 is operated, increases due to a decrease in the speed of the fork, the mean potential on the condenser 18 increases. This increases the potential of the control electrode, reducing the current through the damping windings 12, thereby reducing the damping of the fork and allowing its speed and consequently its frequency to increase. Should the period during which the relay 10 is operated, decrease, due to an increase in the speed of the fork above normal, the mean potential on the condenser decreases. The control electrode potential is thus decreased, allowing the space current and consequently the current through the damping windings 12 to increase which increases the damping of the fork and reduces its speed and consequently its frequency toward normal.

This method of control is sensitive to very slight changes of frequency or speed and as employed in practice, was found to be sufficient to maintain the fork within a fraction of a second of the clock 9 for a long period of time.

The relay 10 through one of its contacts, controls a chronograph 21 by means of which the action of the fork and its regulator may be recorded.

The efficiency of the regulator has been thoroughly demonstrated in actual practice, for during twenty four hours continuous operation of a 50 cycle tuning fork controlled by the regulator, the frequency of the fork did not vary more than two parts in ten thousand. The regulator so employed was adjusted so that under normal conditions relay 10 was operated for one-quarter of each second and released for three quarters of each second. This regulator also employed a battery 17 of 50 volts, a resistance 19 of 50,000 ohms, a condenser 18 of 20 microfarads, a resistance 20 of 200,000 ohms and a battery 14 of 130 volts. These values are not critical and may be varied to meet varying conditions.

Figure 2:
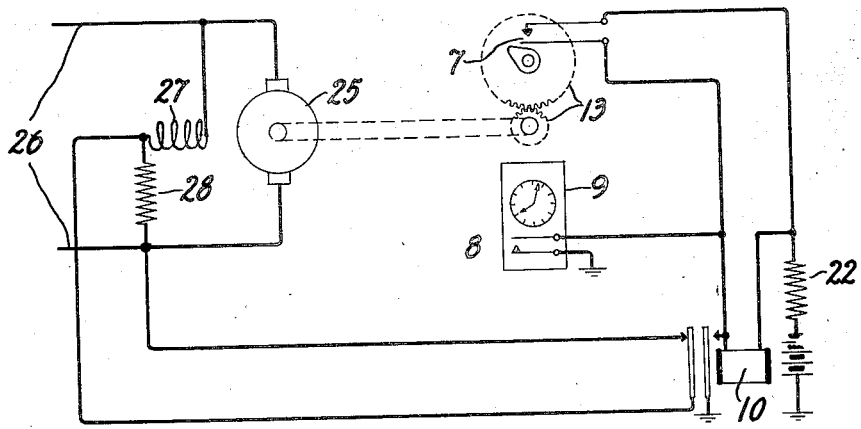
Fig. 2 shows a regulator employing one controlling and regulating relay and applied to an electric motor.

Fig. 2 shows a direct current shunt wound motor 25 supplied with operating current from conductors 26. The shunt field winding 27 of the motor has in series therewith a regulating resistance 28 controlled by relay 10 of the regulator.

The contact 7 is operated by the motor through gears 13, one of which is on the armature shaft of the motor.

The regulator functions in substantially the same manner as in connection with the regulation of the speed of the tuning fork already described. However, the relay 10 directly controls the regulating resistance 28. Thus, when the clock contact 8 closes, relay 10 operates and locks up through its contact in series with a protecting resistance 22. During the time that relay 10 is operated, resistance 28 is included in series with the shunt field winding 27. When the contact 7 operated by the motor closes, relay 10 is short-circuited and releases. Resistance 28 is short-circuited and is removed from the circuit with the field winding 27. During each unit of time therefore resistance 28 is included in circuit with the field winding for a portion of such unit and is removed from circuit therewith during the remaining portion of the unit of time. The adjustment of the contacts 7 and 8 is such that the duration of time in each cycle when the resistance is in circuit and when it is not in circuit is such that the motor will operate at a substantially constant speed, for these periods are so short that the inertia of the motor armature does not allow the speed to vary in synchronism with the changes in field current. Should the speed of the motor tend to decrease, relay 10 will be operated for a longer period than normal, thereby leaving resistance 28 in circuit for a correspondingly longer length of time. On the other hand, if the speed of the motor increases, the period of time when the resistance 28 is in circuit will be decreased correspondingly.

Figure 3:
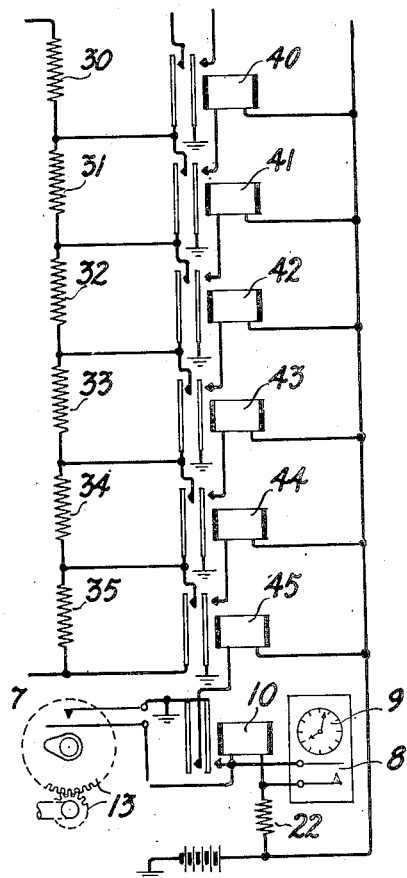
Fig. 3 shows the regulator provided with a plurality of controlling and regulating relays and applied to an electric motor.

The regulator of Fig. 3, similar to that of Fig. 2, has the regulating resistance divided into sections, each controlled by a relay. Thus the regulating resistance has a plurality of sections 30, 31, 32, 33, 34 and 35, controlled by relays 40, 41, 42, 43, 44 and 45. The number of sections of regulating resistance and associated relays may, of course, be greater or less than as shown, if desired. Contact 7 operated by the motor is controlled through the gears 13, one of which gears is on the shaft of the motor as in Fig. 2.

The closure of the motor operated contact 7 operates relay 10 which then locks up. Relay 10 operates relay 45 which is held up thereby.

Relay 45 in turn operates relay 44 and holds it operated. The remaining relays of the chain operate in like manner. As relay 45 operates it short circuits its associated section of resistance, 35. In like manner each relay of the chain when operated short circuits its associated resistance section.

Upon the release of relay 10, relay 45 is released and resistance 35 again cut in circuit. The remaining relays of the chain likewise release in succession cutting in their respective resistance sections.

It is now evident that the number of chain relays operated simultaneously determines the amount of resistance cut out of the field circuit and this number is determined by the length of time that relay 10 is operated.

The relays of the chain are preferably so designed that the time between the operation of relay 10 and the operation of the last relay of the chain is equal to the time between successive closures of the clock operated contact 8. The length of time that relay 10 is operated depends upon speed of the motor, for its circuit is closed by motor operated contact 7 and is opened by closure of clock contact 8.

The regulator of Fig. 3 by being provided with a chain of relays, each controlling a resistance section, cuts into and out of the field circuit of the motor an amount of resistance depending upon the amount of variation of the speed of the motor from normal. This regulator, therefore, serves to quickly compensate for any change in speed thereof within the limits of the regulator.

Figure 4:
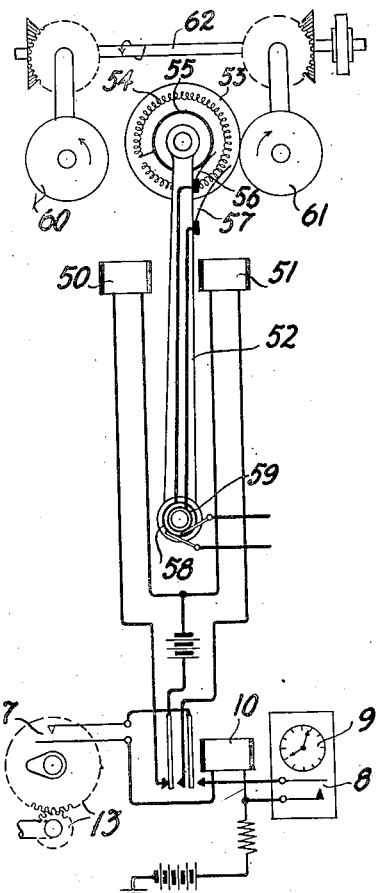
Fig. 4 shows the regulator provided with magntic clutches and applied to an electric motor.

Fig. 4 shows a regulator wherein the control relay 10 controls two magnets 50 and 51 positioned respectively upon opposite sides of a lever 52 pivoted at its lower extremity. The regulator controls a regulating resistance connected in a motor field circuit. When one of these magnets is energized, the amount of regulating resistance in the motor field circuit will be reduced, and when the other is energized, the amount of the regulating resistance will be increased. The lever 52 has pivoted at the upper end thereof a disc 53 which carries a regulating resistance 54 which is in the form of a helix arranged in a circle concentric with the pivot point of the carrying disc 53. One end of the resistance element 54 is connected to a slip ring 55 carried by the disc 53. Brushes 56 and 57 mounted on and insulated from the pivoted lever 52 engage respectively the slip ring 55 and the regulating resistance 54. The brushes 56 and 57 are connected to slip rings 58 and 59 engaged by brushes which are in turn connected in the motor field circuit. Two discs 60 and 61, continuously driven in opposite directions by any suitable driving mechanism, such as a power shaft 62 and gears as shown, are positioned on opposite sides of the disc 53, so that when the disc 60 is engaged by the disc 53 the latter is rotated in a clockwise direction and when disc 61 is engaged by disc 53, the latter is rotated in a counter-clockwise direction. Thus during each unit of time, the amount of regulating resistance in the motor field circuit is being increased during the period that relay 10 is deenergized and is being decreased during the period of energization of relay 10. The amount of decrease or increase depends upon whether the speed of the motor is decreasing or increasing.

The invention set forth herein is, of course, susceptible of various other modifications and adaptations.

The invention claimed is:

1. A regulator for a current translating device capable of producing motion comprising a clock, and means comprising a space discharge device controlled by the conjoint action of the translating device and the time clock for regulating the rate of translation of said translating device.

2. A regulator for a current translating device comprising a current changing device, means for operating said current changing device at regular time intervals, a second current changing device controlled by the translating device, a relay controlled by said current changing devices, and means comprising a space discharge device controlled by said relay for regulating the operation of said translating device.

3. A regulator for an electrically driven tuning fork comprising a switch operated by the tuning fork, a second switch, means controlling the second switch so as to cause it to operate at predetermined constant intervals, a relay controlled by the two switches, damping coils associated with the tuning fork, and means controlled by the relay to vary the magnitude of current through the damping coils.

4. A regulator for an electric device capable of producing motion, comprising a switch operated by said device, a switch, a clock work for operating said switch at regular intervals of time, a relay having contacts, said relay being controlled by the two switches, a circuit and an impedance device arranged to be connected at different intervals of time in said circuit by the conjoint operation of said switches for controlling the energy supply of said electric device.

5. A regulator for an electric motor comprising a switch operated by the motor, a switch operated by means independent of the motor, a relay controlled by the two switches, one of said switches serving to close the energizing circuit of the relay and the other switch serving to deenergize the relay, a circuit arranged to control the energy supplied to said motor, a resistance in said circuit, and means for closing said circuit including said resistance for varying intermittent intervals of time under control of said relay.

6. In an energy transformer, an electrically driven tuning fork, a motor controlled by said tuning fork, a switch operated by said motor, a second switch closed at equal time intervals, means operated by the conjoint action of said switches to increase or decrease the supply of energy to said tuning fork as the rate of vibration thereof decreases or increases respectively from a normal value, and means associated with said fork for generating constant frequency waves.

7. In an energy transforming device, a vibratory fork, a driving magnet for said fork, a switch actuated at intervals of time proportional to the rate of vibration of said fork, a second switch actuated at equal time intervals independently of said fork, damping magnets for said fork, means for supplying energy to said damping magnets in proportion to the difference in rate of closing said switches, whereby said fork is maintained in vibration at a substantially constant frequency.

8. A frequency control system for an electric generator, including a vibratory element, comprising damping magnets associated with said element, a space discharge tube having said magnets included in its output circuit, a clock, and means for controlling the impedance of the output circuit of said space discharge tube comprising an electromagnetic relay controlled by the conjoint action of said generator and said clock.

In witness whereof, I hereunto subscribe my name this 6th day of August A. D., 1923.

JOHN G. FERGUSON.